United States Patent
Carter (10) Patent No.: US 9,261,386 B2
(45) Date of Patent: Feb. 16, 2016

(54) DETECTING PROBE MOUNTING DEVICE

(75) Inventor: Dave Carter, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/115,733

(22) PCT Filed: Apr. 24, 2012

(86) PCT No.: PCT/EP2012/057485
§ 371 (c)(1),
(2), (4) Date: Nov. 19, 2013

(87) PCT Pub. No.: WO2012/156181
PCT Pub. Date: Nov. 22, 2012

(65) Prior Publication Data
US 2014/0090467 A1    Apr. 3, 2014

(30) Foreign Application Priority Data

May 13, 2011    (EP) ..................................... 11166069

(51) Int. Cl.
| | |
|---|---|
| G01D 11/24 | (2006.01) |
| G01L 19/14 | (2006.01) |
| G01P 1/02 | (2006.01) |
| G01D 11/30 | (2006.01) |
| F16M 11/04 | (2006.01) |
| F16M 13/02 | (2006.01) |

(52) U.S. Cl.
CPC ............ *G01D 11/30* (2013.01); *F16M 11/041* (2013.01); *F16M 13/02* (2013.01); *F16M 2200/08* (2013.01)

(58) Field of Classification Search
USPC .......................................................... 73/431
See application file for complete search history.

(56) References Cited

U.S. PATENT DOCUMENTS

| | | |
|---|---|---|
| 3,776,027 A | 12/1973 | Campbell |
| 3,835,696 A | 9/1974 | Amberger |
| 3,859,847 A | 1/1975 | Ronemus |
| 4,011,478 A | 3/1977 | Reenstra |
| 4,018,083 A | 4/1977 | Hoffman |
| 4,027,539 A | 6/1977 | Halloran |

(Continued)

FOREIGN PATENT DOCUMENTS

| | | |
|---|---|---|
| CN | 101091104 A | 12/2007 |
| EP | 1998048 | 12/2008 |

(Continued)

*Primary Examiner* — Lisa Caputo
*Assistant Examiner* — Jamel Williams
(74) *Attorney, Agent, or Firm* — Beusse Wolter Sanks & Maire (57) ABSTRACT

A detecting probe mounting device for fixation in the proximity to a rotating member of a machine is provided. The detecting probe mounting device includes at least two detecting probes with a connecting part and a detecting part for detecting parameters of the machine and/or the rotating member, a probe support structure with one through hole for each detecting probe and with mounting means for mounting each detecting probe at the probe support structure, wherein in a mounted state the connecting part and the detecting part are located on different sides of each through hole, and fixing means for fixing the probe support structure at a predefined position in proximity to the rotating member of the machine, wherein in the fixed state the detecting part of each detecting probe is facing the rotating member.

14 Claims, 5 Drawing Sheets

(56) References Cited

U.S. PATENT DOCUMENTS

| | | |
|---|---|---|
| 4,464,953 A | 8/1984 | Tar |
| 4,907,456 A * | 3/1990 | Rozelle ............................ 73/660 |
| 4,941,105 A | 7/1990 | Marangoni |
| 5,390,402 A | 2/1995 | White et al. |
| 8,521,493 B2 * | 8/2013 | Jousselin ........................... 703/7 |
| 2009/0078052 A1 * | 3/2009 | Twerdochlib ................... 73/660 |
| 2010/0038504 A1 * | 2/2010 | Iemura ..................... 248/220.21 |
| 2011/0277535 A1 * | 11/2011 | Twerdochlib ................... 73/1.84 |

FOREIGN PATENT DOCUMENTS

| | | | |
|---|---|---|---|
| EP | 1998048 A1 * | 12/2008 | ............. F04D 19/04 |
| WO | 2012080778 A1 | 6/2012 | |

\* cited by examiner

DETECTING PROBE MOUNTING DEVICE

CROSS REFERENCE TO RELATED APPLICATIONS

This application is the US National Stage of International Application No. PCT/EP2012/057485 filed Apr. 24, 2012, and claims the benefit thereof. The International Application claims the benefit of European Application No. EP 11166069.2 filed May 13, 2011. All of the applications are incorporated by reference herein in their entirety.

FIELD OF INVENTION

The present invention relates to a detecting probe mounting device, a casing for a machine with such a detecting probe mounting device as well as a respective machine and a method for servicing and/or replacing at least one detecting probe.

BACKGROUND

It is already known that machines comprising rotating members, like shafts or rotors or the like, are in need of detailed monitoring of the rotating member. In particular, the monitoring of the rotation speed or the vibration of the rotating member is necessary to make sure that the rotating member works in the predefined way and does not lead to damage of the machine or injury to person. Therefore, it is already known to use detecting probes to detect such parameters like rotation speed or vibration situation of the rotating member. Such detecting probes are located within the casing and have to be positioned and adjusted with respect to their location in proximity of the rotating member. For example, EP 1 998 048 A1 or US 2010/0038504 A1 describe technical solutions for the mounting of said sensors.

The disadvantage of already known machines in casings with such detecting probes is that the downtime for servicing and/or replacing one or more detecting probes is relatively high. Moreover, the downtime for servicing and/or replacing the detecting probes cannot be postponed due to the fact that such monitoring is crucial for the use of the rotating member and the machine.

SUMMARY OF THE INVENTION

It is an object of the present invention to overcome aforesaid disadvantages of already known machines with detecting probes. In particular, it is an object of the present invention to provide a detecting probe mounting device, a casing comprising such a detecting probe device as well as the respective machine with such a casing and a method for servicing and/or replacing at least one detecting probe, which are all able to provide servicing and/or replacing of at least one detecting probe in a reduced time and therefore with reduced downtime and costs. Moreover, it is an objective of the present invention to reduce the complexity for servicing and/or replacing the detecting probes of machines with rotating members.

Afore-said objective is solved by a detecting probe mounting device, a casing, a machine, and by a method of servicing and/or replacing at least one detecting probe as claimed in the independent claims. Further features and details of the present invention can be found in the dependent claims, the description and in the drawings. Features and details which are described in relation to the respective detecting probe mounting device refer also to a casing, a machine and a method according to the present invention such that it can be referred to the disclosure of each single aspect of the present invention.

According to an embodiment, the detecting probe mounting device is configured for fixation in the proximity to a rotating member of a machine. Such a detecting probe mounting device comprises at least two detecting probes with a connecting part and a detecting part for detecting parameters of the machine and/or the rotating member. Therefore, the detecting probe can be understood as being at least two-parted. The connecting part is the part of the detecting probe, which comprises the connectability, for example by wires, to an external unit like a regulation unit. The detecting part is the sensing part of the detecting probe. It can also be understood as the sensor of the detecting probe comprising one or more sensing means. The detecting part is the part of the detecting probe, which should be brought into proximity of the rotating member of the machine to make sure that it detects the respective parameter of the machine and/or the rotating member. Such parameters can for example be the speed of the rotating member, the vibration of the rotating member, the temperature inside the machine, the pressure inside of the machine or the like.

Moreover, in a detecting probe mounting device, a probe support structure is provided with one, in particular threaded through hole for each detecting probe and with mounting means for mounting each detecting probe at the support structure. Thereby, in mounted state, the connecting part and the detecting part are located on different sites of each through hole. By offering such a probe support structure, at least two detecting probes are located each within one of such at least two through holes. The location is orientated such that the detecting part of each detecting probe faces in another direction than the connecting part. In particular, the detecting part is accessible from the other side of the probe support structure than the connecting part. In other words, the connecting of the detecting probe can take place from the side of the probe support structure which is opposite of the detecting side of the support structure, being defined by the detecting parts of the detecting probes.

Moreover, a detecting probe mounting device according to an embodiment is provided with fixing means for fixing the probe support structure at a predefined position in proximity to the rotating member of the machine. Thereby, in fixed state, the detecting part of each detecting probe is facing the rotating member. In other words, the probe support structure can be fixed within the machine such that the detecting side of the probe support structure, being defined by the orientation of the detecting probes, is facing the rotating member.

By providing a detecting probe mounting device according to an embodiment, the servicing and/or replacing of at least one detecting probe is simplified such that the time for such servicing and/or replacing is reduced. Moreover, the accessibility to service and/or replace each detecting probe is reduced. Servicing in the meaning herein is for example the check or the monitoring of the functionality of a detecting probe.

This can be achieved by the structure according to an embodiment of the detecting probe mounting device. By providing a probe support structure, which is used for supporting the at least two detecting probes, the person who handles the detecting probe mounting device for servicing and/or replacing one or more detecting probes, is supported to handle only one single element, namely the probe support structure. This is independent from the specific number of detecting probes. Therefore, the person who wants to service and/or replace one or more detecting probes can handle the detecting probe mounting device, by removing it from the position in the proximity of the rotating member of a machine. Then he can transport the detecting probe device to a location, where he can easily handle the detecting probes outside of the machine. He does not have to use any highly specific tool to get in touch with the detecting probe, but can have the detecting probe mounting device right in front of him to service and/or replace at least one detecting probe.

Moreover, according to an embodiment, the specific location of each detecting probe can be defined by respective mounting means. Therefore, the person who services and/or replaces at least one detecting probe is able to define such position of each detecting probe easily in front of him and spaced apart from the position in the proximity of the rotating member of the machine. Therefore, by giving the possibility to remove the full detecting probe device and therefore all of the detecting probes in one removing step, the time for servicing and/or replacing of the detecting probes is reduced and costs for such services are minimized. In particular, if the machine is crucial as to the monitoring of the detective parameters, like a machine in the form of a gas turbine, a detecting probe mounting device provides large reduction of downtime and cost factors.

Mounting means of an embodiment can for example be interacting threads, for example having the interaction with a nut or a thread of the detecting probe. For sure, all kind of mounting means, like stud or snap mounting means, are possible within the scope of the present invention although positioning needs to be secure and repeatable.

Also the fixing means can be carried out in different ways. For example, it is possible to carry out the fixing means as snap fixing means, which work together with a resiliency of the material of the fixing means or at least some areas of the probe support structure. The specific position, which is the predefined position of the detecting probe device, in particular the probe support structure, can be defined by bearing means within the casing of the machine or the machine itself.

For example it is possible that the bearing means can also interact with the fixing means of the probe support structure, such the fixing takes place directly at such bearing means to position the probe support structure in the predefined position. By the use of the fixing means, the predefined position of the probe support structure and moreover, the predefined position of the at least two detecting probes relative to the probe support structure, leads to a predefined position of each detecting probe relative to the rotating member of the machine. Therefore, the detecting probes do not need to be adjusted as to their location relative to the rotating member. However, all detecting probes are adjusted as to their location relative to the probe support structure only one time. Therefore, after the removal of the detecting probe device from the predefined position, the service of the detecting probes can take place which without amending the predefined position of the detecting probes relative to the probe support structure. Therefore, after replacing the detecting probe device within the predefined position in the proximity of the rotating member of the machine, automatically, the detecting probes are positioned in their predefined position relative to the rotating member. Further, an adjusting step of the specific location of each detecting probe after the service can be avoided by an embodiment herein although any replaced probe will need to be positioned relative to the probe mounting device.

It can be of advantage, if the probe support structure of the detecting probe device has at least partly plate-like dimensions with the threaded through holes extending between the two sides of the probe support structure. In particular, the threaded through holes extend along or in general along the direction of the thickness of the probe support structure perpendicular to the rotating member. By the term "plate-like dimensions", it has to be understood within the scope of the description that the probe support structure comprises an extension in three dimensions. Thereby, the probe support structure comprises an extension in the direction of the thickness, which is a lot less than the extension in the two other dimensions of the probe support structure. Moreover, a plate-like dimension for the probe support structure can be achieved said way. The use of such plate-like dimensions results in minimized volume which is necessary to place the detecting probe device within a machine in the proximity of the rotating member. Moreover, the weight of such probe support structure and the cost for the material can be reduced that way. It has to be understood that plate-like dimensions does not necessarily lead to a flat plate. The term of at least partly plate-like dimensions also includes curved plates. Having such curved plates, the threaded through holes also follow in particular along or in general along the direction of the thickness of the probe support structure.

It can also be of an advantage, if in an embodiment of a detecting probe mounting device, the probe support structure is curved, in particular with a curvature corresponding at least partly to the curvature of the rotating member. The correspondence of the two curvatures is to be understood as for the probe support structure and the rotating member having the same or almost the same location of the centers of the curvature radius. Therefore, the probe support structure, which is usually located radial outside of the rotating member, has a greater curvature radius, but the difference between the two curvature radiuses is equal or approximately equal to the distance between the probe support structure and the rotating member. By providing such a curved embodiment, the distance between the detecting probe device and the rotating member can be kept equal or almost equal by surrounding partly the rotating member with the probe support structure. Thereby, the distance between detecting probe can be kept in general equal for all detecting probes. Due to the fact that the distance should be minimized for a better monitoring or for the possibility to use easier, smaller and cheaper detecting probes, such an embodiment is of an advantage.

According to a further embodiment, the threaded through holes of the detecting probe device can be located such that the prolongation of the axis of at least one threaded through hole intersects with the rotation axis of the rotating member. This leads to an orientation of the threaded through holes such that the detecting probes, located within the through holes, are also orientated facing the rotating axis of the rotating member. It has to be understood that such an embodiment can be used with a plate-like probe support structure which is curved or at least partly curved or in general flat. Therefore, the through holes, in particular their orientation, have to be understood to be independent from the specific geometrical expression of the probe support structure. By facing the rotation axis of the rotating member, the detecting probes can be positioned in a more specific way, in particular in a closer proximity to the rotating member. Moreover, the direct orientation of the detecting part can be optimized such that it directly faces the rotating member, in particular with a facing plane tangential to the rotating member.

It is also possible, that according to a further embodiment of a detecting probe mounting device, sealing means are provided between the probe support structure and at least one of the detecting probes. The sealing means can be used to avoid that oil or any other kind of fluid can leave the cavity surrounding the rotating member. In particular for machines, which are in need of fluids in the proximity of the rotating member, or which transport fluids along the rotating member, such sealing means provide the possibility to seal the cavity of the rotating member. Moreover, such sealing means can be serviced and/or replaced easily the same way, as it happens to be able for the detecting probes.

It is also possible, that, according to a further embodiment of a detecting probe mounting device, the fixing means are configured for a reversible fixing of the probe support structure. The reversibility of the fixing means has the advantage, that the service and/or replacement method can be carried out multiple times. In particular, the fixing and the loosening of the fixing means can take place several times such that each servicing and/or replacing step can make use of the advantages of a detecting probe mounting device.

It can also be possible that, according to an embodiment of a detecting probe device, the probe support structure comprises adjustment means for adjusting the position of the detecting part of at least one detecting probe relative to the probe support structure. Such adjusting means can for example make use of internal and/or external threads which correspond to each other. Also snap adjustment means with different snapping positions can be used for adjusting the detecting probe. The adjustment should take place in particular along the central axis of the through hole for each detecting probe. Thereby, the distance between the detecting probe and the rotating member in the fixed state of the probe support structure can be adjusted indirectly.

In particular, the adjustment means are independently useable from the mounting means. Therefore, if the adjustment by the adjustment means has already taken place, also a replacement of a detecting probe by loosening the mounting means can take place without any further adjustment step. The pre-adjustment by the adjustment means for the indirect adjustment of the distance between the detecting probe and the rotating member can be used for all following servicing and/or replacing steps of the detecting probes.

Moreover, it is possible that the at least two detecting probes are configured for measure different kinds of parameters of the machine and/or the rotating member. That way, all different kinds of detecting probes can be mounted and demounted by one single step, namely the movement of the probe support structure. No single handling of single sensors has to be carried out. Moreover, after replacement of the probe support structure, all detecting probes are automatically positioned in the predefined way. The need of readjustment is avoided.

Furthermore, according to embodiments, the detecting probe mounting device can be characterized in that the fixing means and/or the mounting means are accessible from the side of the probe support structure, facing away from the rotating member in a fixed state. This leads to easier handling of the probe support structure. In particular no further parts of the machine have to be disassembled for maintaining or exchanging the detecting probes. Downtime of the machine is reduced significantly by said embodiment.

One further aspect herein is a casing for a machine with a rotating member, comprising a main cavity for accommodation of the rotating member. Moreover, a detecting probe device cavity is provided within the casing, wherein a detecting probe device with the features according to embodiments herein is located inside the detecting probe device cavity. Moreover, the casing comprises bearing means which are provided within the detecting probe device cavity for bearing the detecting probe device in its predefined position in the proximity to the rotating member of the machine. The casing predefines the predefined position of the detecting probe device, which has been discussed in detail above. Thereby, the casing according to embodiments herein can make use of a detecting probe mounting device and all the advantages thereof. In particular, it is possible that the fixing of the detecting probe device with the fixing means can take place directly or in the proximity of the bearing means. The fixing, for example, can take place by the use of snap mechanisms or screws, bolts or nuts.

It can be of advantage, if a casing is further embodied with an opening to the detecting probe device cavity with a free cross-section of identical or a greater geometrical dimension than the geometrical dimensions of the detecting probe device. Thereby, movement of the detecting probe device through that opening is enabled. The detecting probe device therefore can be moved through the opening such that reversible movement and thereby removability and replaceability is provided for the detecting probe device. Of course it is also possible that the opening in general provides the possibility to introduce the probe device. This can also include openings which are of a smaller free cross-section than defined above. For example the detecting probe device has to be inserted in such a case in steps by the use of such a smaller opening.

It is also possible, that according to a further embodiment of a casing, a cover is configured to cover the opening and said cover comprises signal exits for connecting the detecting probes to an external unit. Said external unit can for example be a regulation and/or a monitoring unit making use of the data sensed by the detecting probes. Such cover is in particular sealed against the outside to make sure that the connecting part of the detecting probe is secured. It is also possible that more than one signal exit is provided for one detecting probe such that different connections are possible to each detecting probe.

A further aspect herein is a machine, in particular a turbomachine (e.g. a gas turbine engine, a steam turbine engine or a compressor), with a rotating member and a casing. A machine according to said definition therefore makes use of the same advantages already described above with respect to the casing as well as with respect to the detecting probe mounting device.

It is also an aspect herein to provide a method of servicing and/or replacing at least one detecting probe of a detecting probe device of a casing. Such method comprises in particular the following steps:

Providing access to the probe device cavity,
Loosening the fixing means of the detecting probe mounting device,
Removing the detecting probe mounting device from the detecting probe device cavity,
Servicing and/or replacing at least one of the detecting probes,
Placing the detecting probe mounting device on the bearing means in the detecting probe device cavity, and
Fixing the detecting probe mounting device in the predefined position with the fixing means.

A method herein can be carried out in particular with a detecting probe mounting device and a casing. It has to be noted that the method can be carried out the best way, if the detecting probe device comprises the features herein. Therefore, the method leads to the possibility to reduce downtime and costs for servicing and/or replacing and thereby makes use of the advantages already described in detail with respect to the detecting probe and with respect to the casing.

BRIEF DESCRIPTION OF THE DRAWINGS

The present invention is further described with respect to the accompanying drawings. During the description of the accompanying drawings, the terms "left", "right", "above" and "below" are used with respect of an orientation of the drawings with regular readable reference signs. The figures show.

DETAILED DESCRIPTION

Figure 1:
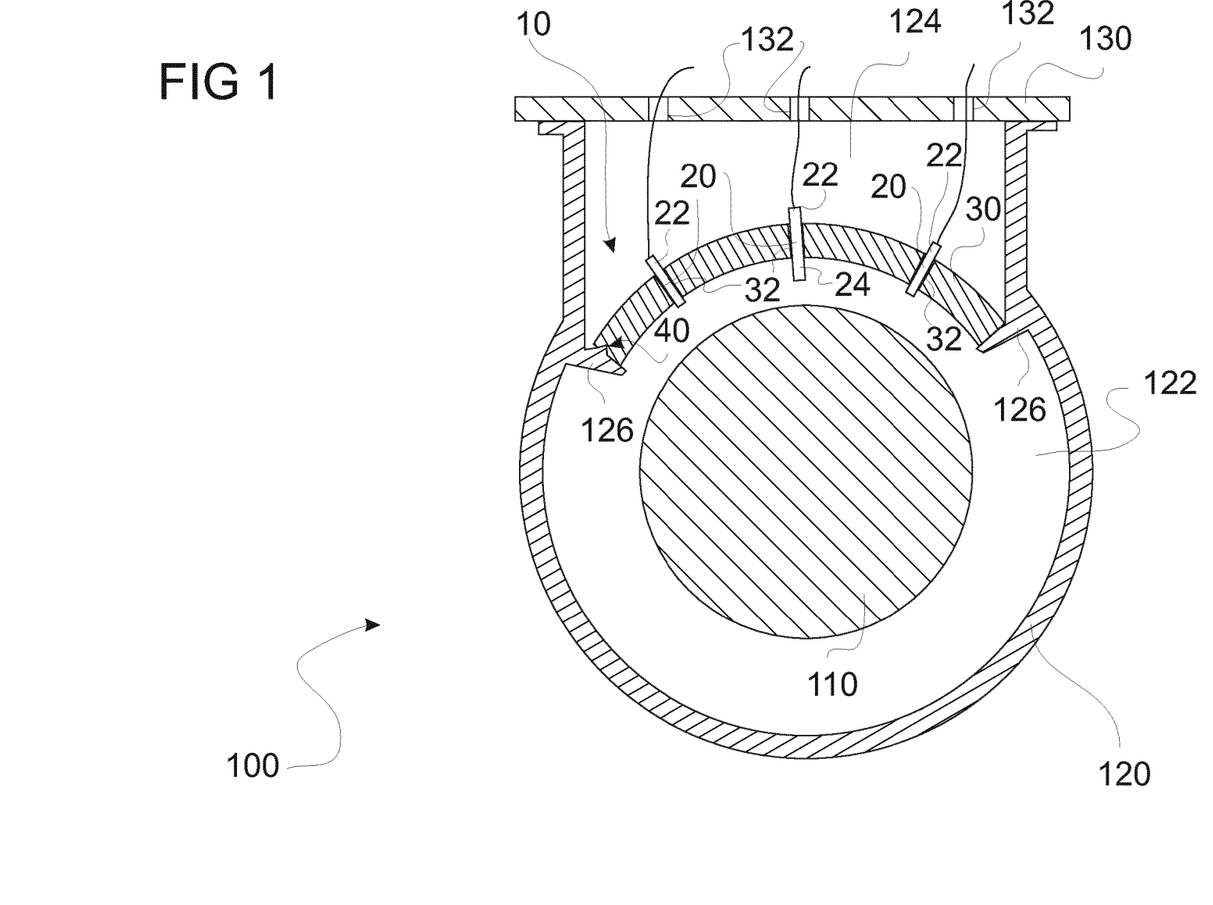
FIG. 1 a cross-sectional view of one embodiment of a machine with a detecting probe mounting device, FIG. 2 an embodiment of a probe support structure of a detecting probe device in cross-sectional view, FIG. 3 in partly cross-sectional view the location of a detecting probe within the probe support structure of a detecting probe device, FIG. 4 a schematic perspective view of an embodiment of a casing, and FIG. 5 a partly cross-sectional of view of an embodiment of a casing.

In FIG. 1, one embodiment of a machine, making use of a casing 120 and a detecting probe mounting device 10 is shown.

The detecting probe mounting device 10 of the embodiment of FIG. 1 comprises a curved, at least partly plate-like probe support structure 30. The curvature of the probe support structure 30 corresponds with the curvature of rotating member 110, which is a rotating shaft in the present embodiment. The correspondence between the two curvatures is to be understood such that the center of the curvature radius of the probe support structure 30 is identical or almost identical with the center of the rotating member 110.

Within the probe support structure 30, threaded through holes 32 are located. Detecting probes 20 are inserted in such through holes 32. The insertion took place such that the detecting probes 20 are orientated with their detecting part 24 facing the rotating member 110 and the connecting part 22 facing in the other, in particular contrary direction. At the connecting parts 22, wires are shown, which are in signal communication with a not shown regulation or monitoring unit. Alternatively to that also wireless connecting can take place within the scope herein. The probe support structure 30 is located in a predefined position with respect to the proximity to the rotating member 110. This is achieved by providing bearing means 126 for bearing the probe support structure 30. Moreover, the probe support structure 30 is fixed at the bearing means 126 with fixing means 40 for example in form of a snap mechanism.

The casing 120 according to an embodiment described with respect to FIG. 1, comprises two different cavities. The main cavity 122 accommodates the rotating member 110. A smaller cavity, namely the detecting probe device cavity 124, accommodates the detecting probe device 10.

According to the embodiment of FIG. 1, the detecting probe device cavity 124 is covered by a cover 130. Such cover 130 can for example be sealed and/or fixedly mounted to the casing 120. The cover 130 comprises signal exits 132 through which the wires from the connecting parts 22 of the detecting probes 20 can be guided.

The servicing and/or monitoring of at least one detecting probe 20 can take place for example as described in the following with respect to FIG. 1.

To service and/or replace at least one detecting probe 20, the cover 130 is removed. In the next step, the person who carries out the servicing and/or replacing step, removes the detecting probe mounting device 10 from the detecting probe device cavity 124 by loosening the fixing means 40. After having removed the detecting probe device 10, the person has a lot better access to the probe support structure 30 and the detecting probes 20. In such a position he can service the single detecting probes 20 and, if necessary, replace at least one detecting probe 20. By replacing the detecting probe 20, he uses the mounting means 34 for removing the old detecting probe 20 and replacing it by a new detecting probe 20.

Moreover, he can use an adjustment means 60 to place the detecting probes 20 in a specific predefined position relative to the probe support structure. After finishing his servicing and/or replacing step, he replaces the probe support structure 30 and therefore also the detecting probe device 10 within the detecting probe device cavity 124. He uses the connecting wires to guide them through the signal exits 132 and closes the cover 130. A further step for adjusting the detecting probes 20 with respect to their distance to the rotating member 110 is not necessary due to the use of a detecting probe mounting device 10. Therefore, the downtime and the risk of error in adjustment of the detecting probes 20 are reduced with respect to the servicing and/or replacing method.

Figure 2:
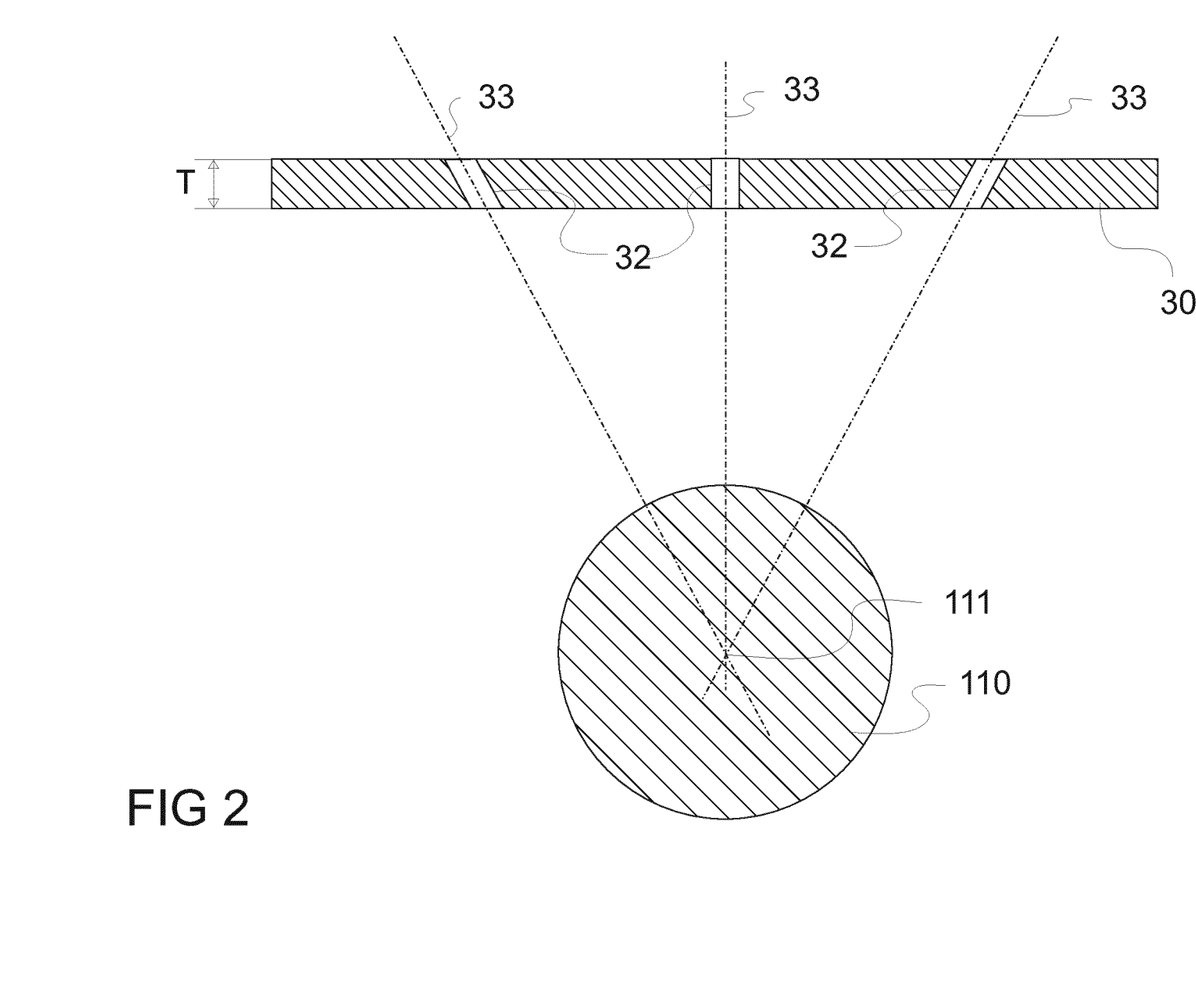

In FIG. 2, an example of an almost flat probe support structure 30 is shown. In said FIG. 2, also the direction of the thickness T is shown very clearly. To make sure, that the orientation of detecting probes 20 is that way such that the detecting part 24 will face the rotating member 110, the through holes 32 are angular within the probe support structure 30. That means that the axis 33 of each through hole 32 intersects with its prolongation the rotation axis 111 of the rotating member 110. In the following step, when the detecting probes 20 are inserted inside of the through holes 32, the orientation of the detecting probes 20 will be in the optimum way.

Figure 3:
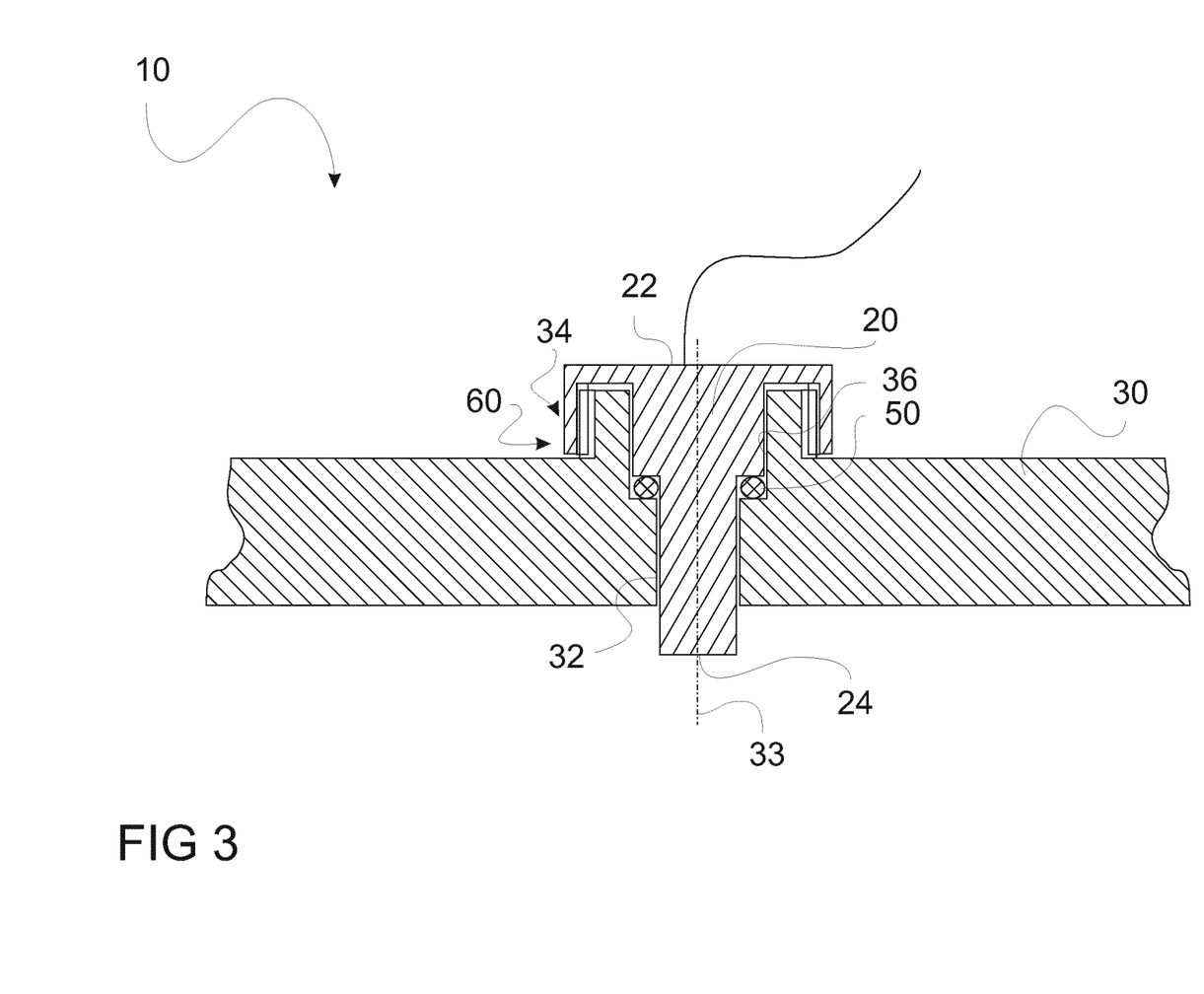

FIG. 3 shows one embodiment of the mounting of the detecting probe 20 within the probe support structure 30 of the detecting probe device 10. The detecting probe 20 comprises a thread, which interacts with an outward thread of the probe support structure 30. That way, the threads of the mounting means 34 can also be used as adjustment means 60. By starting a rotation of the detecting probe 20, the position of the detecting probe 20 can be varied along the axis of the detecting probe 20. After the predefined position of the detecting probe 20 has been reached, the probe is locked with a standard nut.

Also shown in FIG. 3 are sealing means 50 which surround the detecting probe 20 and seal the rotating member 110 against the outside, in particular the detecting probe device cavity 124.

Figure 4:
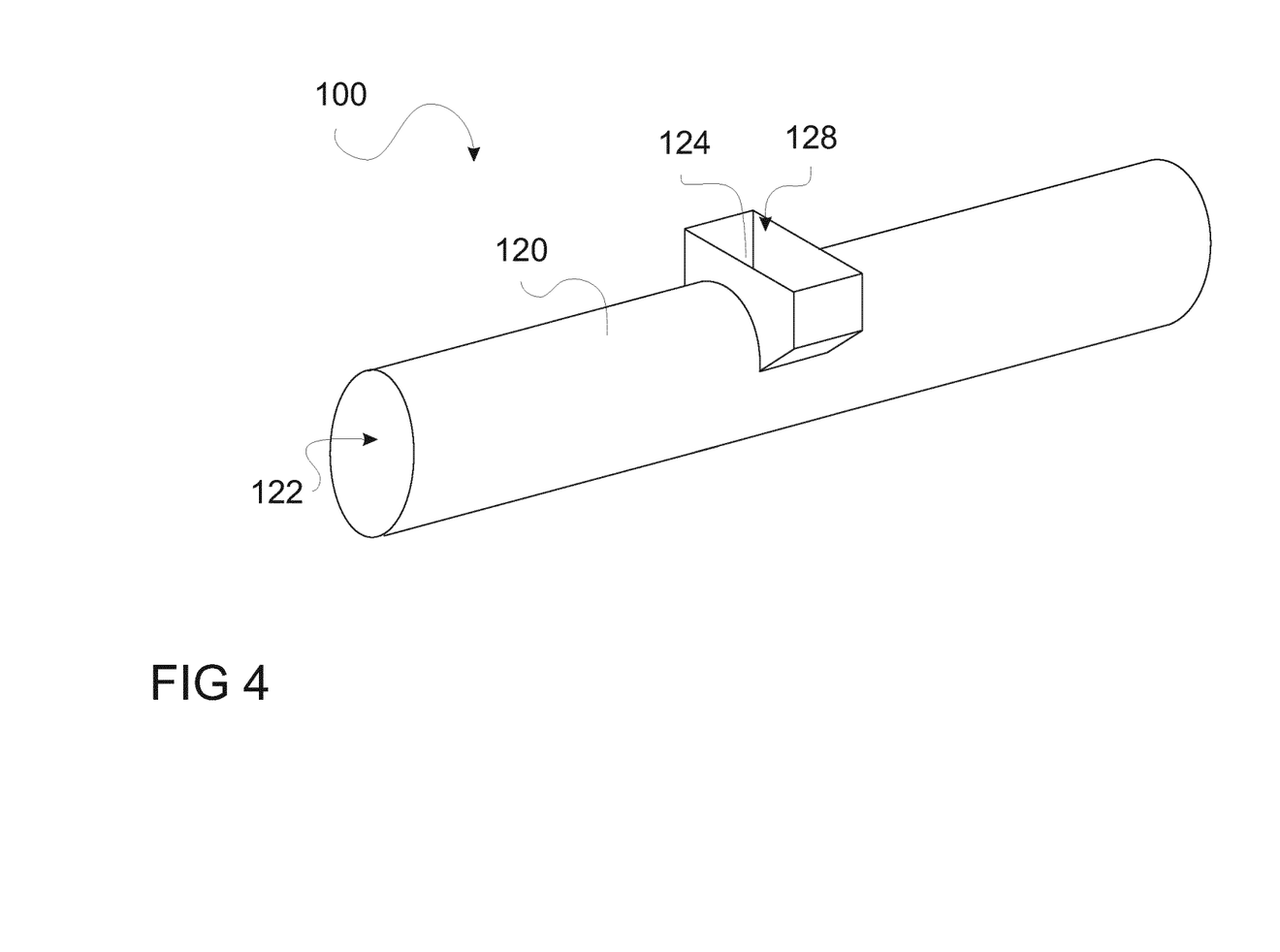

FIG. 4 shows a perspective view of an embodiment of a casing 120. It can be seen, that the main cavity 120 extends along an axis, which is in particular coaxial with the rotating member 110. The respective detecting probe device cavity 124 is a lot smaller than the main cavity 122. The detecting probe device 124 of the casing 120 of the machine 100 is accessible through an opening 128. As it can be seen, the casing 120 surrounds the detecting probe device cavity 124 very closely such that a working inside of the detecting probe device cavity 124 is combined with high complexity and very narrow space for working in there. Therefore, the use of a detecting probe device 10 provides the possibility to remove the detecting probe mounting device 10 and transfer it to a position which provides the possibility of free accessibility to the detecting probe mounting device 10, in particular the detecting probes 20.

Figure 5:
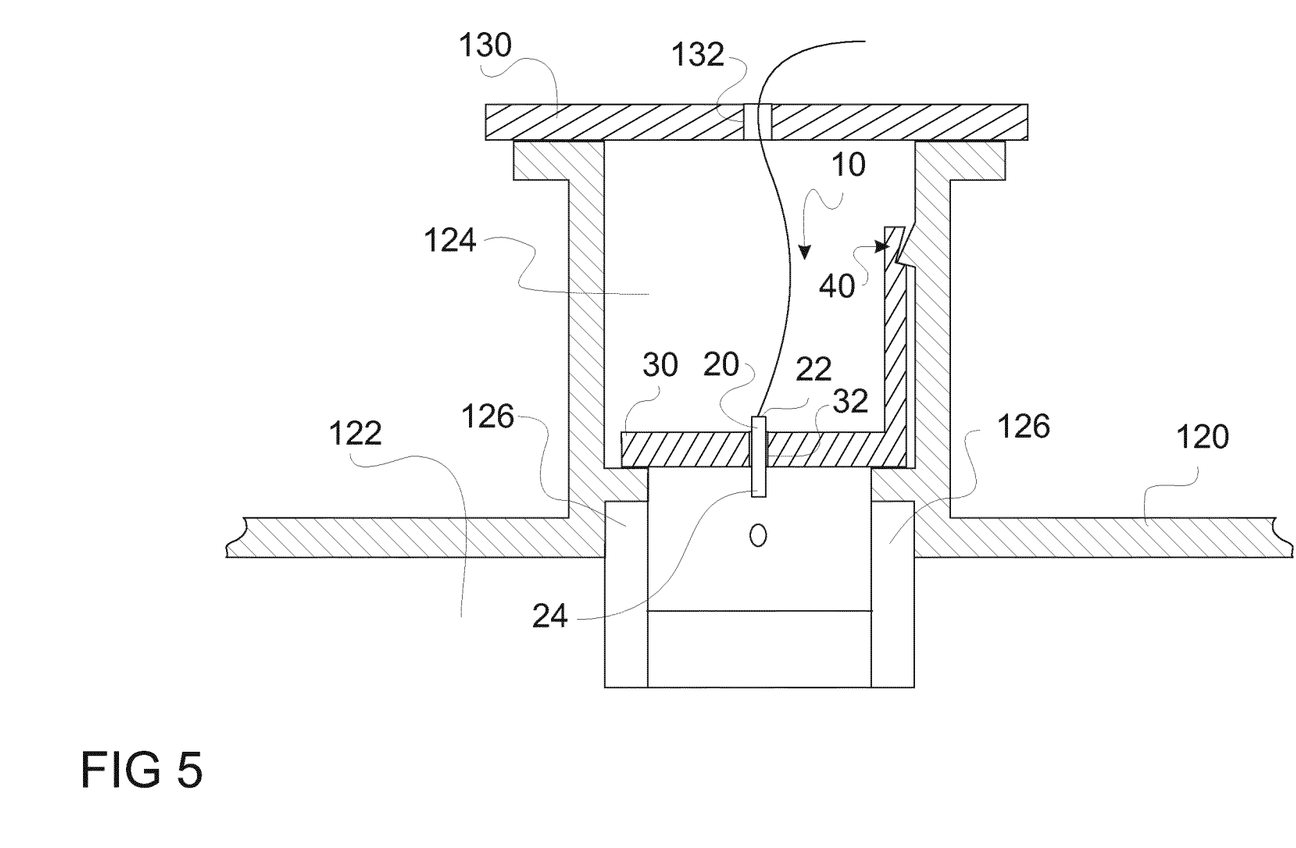

FIG. 5 shows a further embodiment. This detecting probe device 10 also comprises an at least partly curved, plate-like geometrical extension for the probe support structure 30. Moreover, it comprises the form of an L in the cross-sectional view. The fixing means 40 is also carried out as a snap mechanism, which snap fits with a part of the casing 120 surrounding the detecting probe device cavity 124. Moreover, bearing means 126 also bear the probe support structure 30 in a predefined position. The detecting probe 20 is once more orientated within the through hole 32 such that the detecting part 24 faces inwardly to the main cavity 122 and thereby facing the rotating member 110. The connecting part 22 is connected to a wire, which is guided through the signal exit 132 in the cover 130.

As an advantage as for service the complete detecting probe mounting device 10 including the probes 20 can be removed from its mounting position in one piece. The position of the probes on the mounting device therefore remains and only needs to be set up once, as the complete device 10 can be removed and re-installed. Additionally the probes may only be calibrated once prior to assembly and do not need to be calibrated once they are in their final position in the machine.

The present invention has been described only by the ways of example. The different features of the different embodiments therefore can be combined with each other freely, if of technical sense, without leaving the scope of the present invention.

The invention claimed is:

1. A detecting probe mounting device for fixation in the proximity to a rotating member of a machine, the rotating member having a rotation axis, the detecting probe mounting device comprising
   at least two detecting probes with a connecting part and a detecting part for detecting parameters of the machine and/or the rotating member,
   a probe support structure with a through hole for each detecting probe and with mounting means for mounting each detecting probe at the probe support structure, wherein in a mounted state the connecting part and the detecting part are located on different sides of each through hole, and
   fixing means for fixing the probe support structure at a predefined position in proximity to the rotating member of the machine, wherein in the fixed state the detecting part of each detecting probe is facing the rotating member,
   wherein the through holes are located such that prolongation of the axis of at least one through hole intersects with the rotation axis of the rotating member and the through holes are circumferentially spaced apart about the rotation axis.

2. The detecting probe mounting device according to claim 1, wherein the probe support structure has at least partly plate-like dimensions with the through holes extending between the two sides of the probe support structure along or substantially along a direction of a thickness of the probe support structure.

3. The detecting probe mounting device according to claim 1, wherein the probe support structure is curved with a curvature corresponding at least to a curvature of the rotating member.

4. The detecting probe mounting device according to claim 1, wherein sealing means are provided between the probe support structure and at least one of the detecting probes.

5. The detecting probe mounting device according to claim 1, wherein the fixing means are configured for reversible fixing of the probe support structure.

6. A detecting probe mounting device for fixation in the proximity to a rotating member of a machine, comprising
   at least two detecting probes with a connecting part and a detecting part for detecting parameters of the machine and/or the rotating member,
   a probe support structure with a threaded through hole for each detecting probe and with mounting means for mounting each detecting probe at the probe support structure, wherein in a mounted state the connecting part and the detecting part are located on different sides of each through hold, and
   fixing means for fixing the probe support structure at a predefined position in proximity to the rotating member of the machine, wherein in the fixed state the detecting part of each detecting probe is facing the rotating member,
   wherein the probe support structure comprises adjustment means for adjusting the position of the detecting part of at least one detecting probe relative to the probe support structure.

7. A detecting probe mounting device for fixation in the proximity to a rotating member of a machine, comprising
   at least two detecting probes with a connecting part and a detecting part for detecting parameters of the machine and/or the rotating member,
   a probe support structure with a threaded through hold for each detecting probe and with mounting means for mounting each detecting probe at the probe support structure, wherein in a mounted state the connecting part and the detecting part are located on different sides of each through hole, and
   fixing means for fixing the probe support structure at a predefined position in proximity to the rotating member of the machine, wherein in the fixed state the detecting part of each detecting probe is facing the rotating member,
   wherein the at least two detecting probes are configured for measuring different kinds of parameters of the machine and/or the rotating member.

8. A detecting probe mounting device for fixation in the proximity to a rotating member of a machine, comprising
   at least two detecting probes with a connecting part and a detecting part for detecting parameters of the machine and/or the rotating member,
   a probe support structure with a threaded through hole for each detecting probe and with mounting means for mounting each detecting probe at the probe support structure, wherein in a mounted state the connecting part and the detecting part are located on different sides of each through hole, and
   fixing means for fixing the probe support structure at a predefined position in proximity to the rotating member of the machine, wherein in the fixed state the detecting part of each detecting probe is facing the rotating member,
   wherein the fixing means and/or the mounting means are accessible from the side of the probe support structure, facing away from the rotating member in a fixed state.

9. A casing for a machine comprising a turbo-machine, with a rotating member, comprising
   a main cavity for accommodation of the rotating member and a detecting probe mounting device cavity,
   wherein a detecting probe device according to claim 1 is located inside the detecting probe device cavity,
   wherein bearing means are provided within the probe device cavity for bearing the detecting probe device in its predefined position in proximity to the rotating member of the machine.

10. The casing according to claim 9, further comprising an opening to the detecting probe device cavity with a free cross-section of identical or greater geometrical dimensions than the geometrical dimensions of the detecting probe device to enable movement of the detecting probe mounting device through said opening.

11. A casing for a machine comprising a turbo-machine, with a rotating member, comprising
a main cavity for accommodation of the rotating member and a detecting probe mounting device cavity,
wherein a detecting probe device according to claim 1 is located inside the detecting probe device cavity,
wherein bearing means are provided within the probe device cavity for bearing the detecting probe device in its predefined position in proximity to the rotating member of the machine,
an opening to the detecting probe device cavity with a free cross-section of identical or greater geometrical dimensions than the geometrical dimensions of the detecting probe device to enable movement of the detecting probe mounting device through said opening,
wherein a cover is configured to cover the opening and wherein the cover comprises signal exits for connecting the detecting probes to an external unit.

12. A machine comprising a turbomachine, with a rotating member and a casing according to claim 9.

13. A method of servicing and/or replacing at least one detecting probe of a detecting probe device of a casing according to claim 9, comprising:
providing access to the probe device cavity,
loosening the fixing means of the detecting probe mounting device,
removing the detecting probe mounting device from the detecting probe device cavity,
servicing and/or replacing at least one of the detecting probe,
placing the detecting probe mounting device on the bearing means in the detecting probe device cavity, and
fixing the detecting probe mounting device in the predefined position with the fixing means.

14. The detecting probe mounting device according to claim 1, wherein the through holes are threaded.

* * * * *